United States Patent
Vial et al.

Patent Number: 5,185,835
Date of Patent: Feb. 9, 1993

[54] FIBER ATTACHMENT MEANS FOR INTEGRATED OPTICAL COMPONENT

[75] Inventors: Jacques J. Vial, Noisy S/Ecole;
Pierre-Jean M. Laroulandie, Avon;
David Henry, Saint Michel s/Orge;
Thierry L. A. Dannoux, Avon;
Sylvain M. F. Gremetz,
Vaux-Le-Penil, all of France

[73] Assignee: Corning Incorporated, Corning, N.Y.

[21] Appl. No.: 850,665

[22] Filed: Mar. 12, 1992

[30] Foreign Application Priority Data

Mar. 14, 1991 [FR] France ............... 91 03089

[51] Int. Cl.⁵ ............................................. G02B 6/30
[52] U.S. Cl. .................................. 385/49; 385/14; 385/51
[58] Field of Search ............ 385/31, 38, 49, 51, 385/88, 91, 92, 94, 14; 250/131, 227.11; 156/60, 158, 326, 327, 329, 331.1, 349, 433

[56] References Cited

U.S. PATENT DOCUMENTS

| | | | |
|---|---|---|---|
| 3,864,019 | 2/1975 | Smolinsky et al. | 385/49 |
| 3,994,559 | 11/1976 | Crow | 385/49 X |
| 4,237,474 | 12/1980 | Ladany | 385/92 X |
| 4,523,802 | 6/1985 | Sakaguchi et al. | 385/92 X |
| 4,627,687 | 12/1986 | Dorn et al. | 385/92 X |
| 4,767,174 | 8/1988 | Carenco et al. | 385/49 X |
| 4,798,439 | 1/1989 | Preston | 385/92 X |
| 4,803,361 | 2/1989 | Aiki et al. | 385/49 |
| 4,836,645 | 6/1989 | Lefevre et al. | 385/49 X |
| 4,943,130 | 7/1990 | Dannoux et al. | 385/14 |
| 4,953,936 | 9/1990 | Regener et al. | 385/49 |
| 4,984,866 | 1/1991 | Boisgontier et al. | 385/49 X |
| 5,080,458 | 1/1992 | Hockaday | 385/14 |
| 5,107,535 | 4/1992 | Hakogi | 385/49 |
| 5,123,068 | 6/1992 | Hakoun et al. | 385/49 X |

*Primary Examiner*—Brian Healy
*Attorney, Agent, or Firm*—K. McNeill Taylor, Jr.

[57] ABSTRACT

An integrated optical component comprising at least one waveguide integrated into a substrate and connected to the end of an optical fiber which is attached to the substrate at said fiber end and in a region separated from said fiber end by a first drop of adhesive and a second drop of adhesive, respectively. The adhesive product which constitutes the first drop has a glass transition temperature located in a predetermined operating temperature range of the component, while the adhesive product which constitutes the second drop has a glass transition temperature located generally above this operating temperature range, thereby assuring the absorption of differential expansions in such a way as to maintain the optical continuity of the fiber/waveguide attachment and the mechanical strength of the fiber/-substrate attachment.

21 Claims, 1 Drawing Sheet

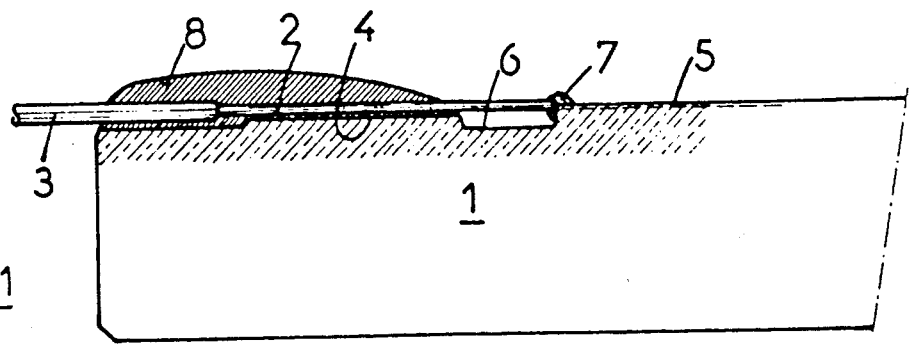
FIG.:1
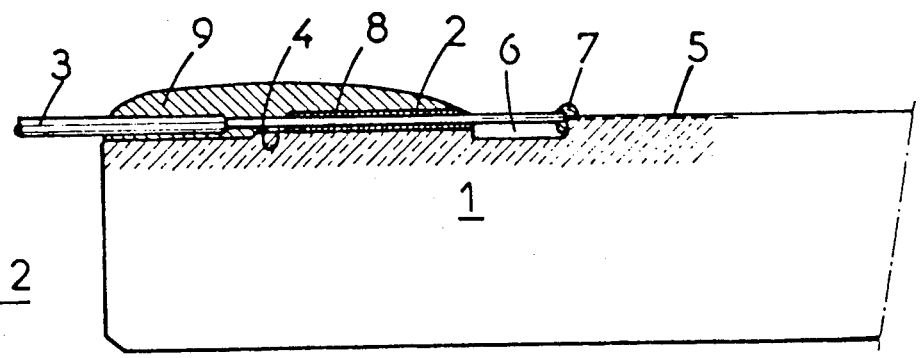
FIG.:2
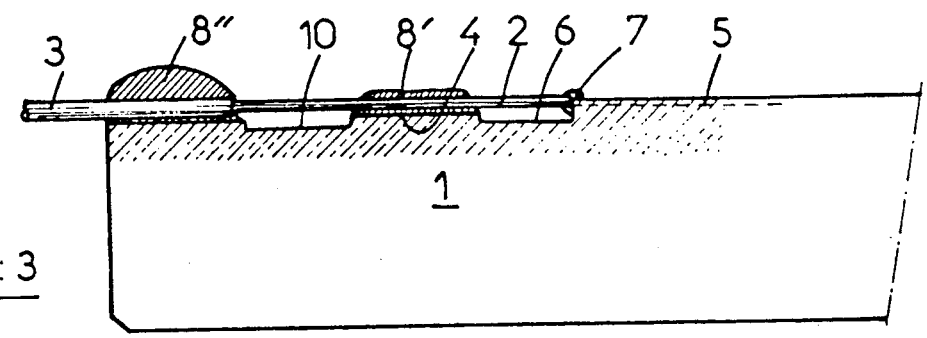
FIG.:3
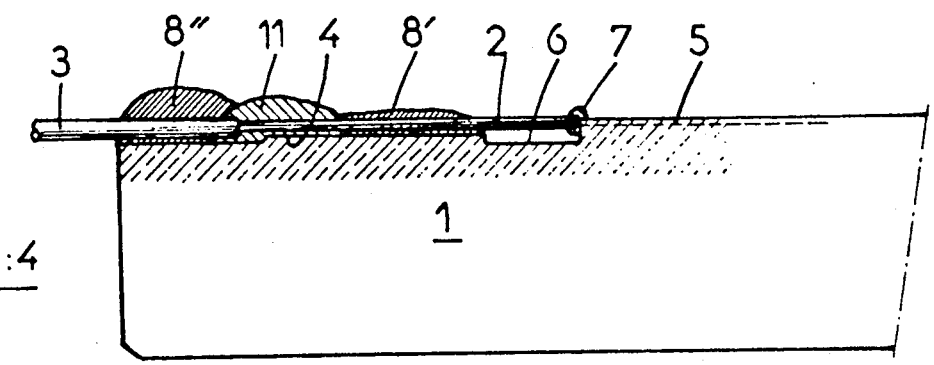
FIG.:4 ns to decreasing temperatures, from ambient temperature toward low temperatures ($-40°$ C. for example).

FIBER ATTACHMENT MEANS FOR INTEGRATED OPTICAL COMPONENT

The present invention relates to an integrated optical component comprising at least one waveguide integrated into a substrate and coupled to the end of a single mode or multimode optical fiber. More specifically, the invention relates to such a component in which the fiber is glued to the substrate on the one hand at the fiber end which faces an output of the integrated waveguide and on the other hand at a location distant from this output.

BACKGROUND OF THE INVENTION

Such integrated optical components are known, for example in Dannoux et al. U.S. Pat. No. 4,943,130 filed Mar. 12, 1987 and assigned to Corning Glass Works. Conforming to the preliminary specifications of specification T.W.NWT 000442 published in November 1990 by Bellcore (USA), such optical components must pass predetermined tests which assure the mechanical strength of the fiber/substrate attachment and the transmission quality of an optical signal. The mechanical strength is tested by a pulling force which is exerted upon the fiber/substrate attachment, and the attachment must resist a force of 5N across the temperature range from $-40°$ C. to $+85°$ C., or, further, in an atmosphere of 93% relative humidity at 60° C., or, further, during aging for 2000 hours at 85° C. Moreover, the excess signal loss observed for a transmitted optical signal must not exceed a predetermined threshold, for example, 0.8 dB for a component with one input and two outputs.

With the integrated optical components which are cited above one encounters a problem which is related to the different thermal expansions of the materials forming the substrate, the optical fibers and the adhesives of the assembly. The substrate is readily made of a glass which has a coefficient of thermal expansion on the order of $80 \times 10^{-7}$ $K^{-1}$. The integrated optical waveguide is formed in this glass by photolithographic masking and ion exchange, for example. The optical fiber, either single mode or multimode, comprises very pure silica and doped silica which have a coefficient of thermal expansion which is less than $6 \times 10^{-7}$ $K^{-1}$, for example. Thus, for the same temperature increase, the substrate is expanded more than the fiber, which fiber is attached to the substrate at two separated points. The substrate therefore exerts a tensile stress on the section of the fiber situated between these two points. This tensile force may generate a fiber fracture, a change in the optical properties of the silica which comprises the fiber, or a deterioration of the fiber attachment points. The coefficients of thermal expansion of the adhesive products used may also play an important role in the differential expansions which have been observed. Such phenomena can alter, and in some cases even destroy the optical continuity of the attachment between the fiber and the waveguide of the integrated optical component, and thus result in a concomitant alteration or even a complete loss of an optical signal transmitted across this attachment. Other causes of alteration of the attachment are the effects of environment, notably in humid atmosphere, and the aging of the materials comprising the component, especially in the event of excursions to decreasing temperatures, from ambient temperature toward low temperatures ($-40°$ C. for example).

The present invention has therefore as its aim the manufacture of an integrated optical component of the type described above and designed to insure satisfactory mechanical and optical characteristics across a predetermined wide range of temperature.

The present invention has also as its aim the manufacture of such a component having a satisfactory resistance to the effects of a high humidity atmosphere, and to the effects of aging.

SUMMARY OF THE INVENTION

These objects of our invention, as well as others which will be apparent from the present description, are achieved by an integrated optical component designed for use in a predetermined temperature range and comprising at least one integrated optical waveguide formed in a substrate and coupled at an output to an optical fiber attached to the substrate at that output and in a region separated therefrom, by at least first and second drops of adhesive product, respectively. The adhesive products constituting these drops each have a glass transition temperature. In accordance with the present invention, the glass transition temperature of the first drop of adhesive product is within the predetermined temperature range, and the glass transition temperature of the second drop is in a second temperature range situated generally above the predetermined range, the lower limit of the second range being $+/-10°$ C. of the upper limit of the predetermined range.

Thus, the mechanical strength of the fiber/substrate attachment is improved so that the differential expansion will not result in deterioration of the fiber or alter the optical continuity of the fiber/waveguide attachment.

According to an alternative embodiment of manufacturing the integrated optical component in accordance with the present invention, a third drop of adhesive product is placed further away from the fiber endface than the second drop, in order to secure the fiber to the substrate, the glass transition temperature of the third drop being generally above the predetermined temperature range. As will be described below, one can thus diminish the volume of adhesive product utilized and the influence that swelling of these products in a humid environment exerts upon the optical quality of the fiber/waveguide attachment.

According to yet another method of manufacturing the integrated optical component in accordance with the present invention, a fourth drop of adhesive product is used to attach to the substrate the section of the fiber situated between the second and third drops, the glass transition temperature of this adhesive product being within the predetermined temperature range. As will be explained in the following portion of the present description, one thus increases the strength of the section of the optical fiber which is situated between the second and third drops of adhesive product.

Other characteristics and advantages of the present invention will appear upon reading the following description, and upon examination of the attached FIGS.

BRIEF DESCRIPTION OF THE DRAWINGS

FIG. 1 depicts a partial longitudinal cross-section of an integrated optical component according to the invention, showing the attachment between the fiber and a waveguide integrated in the substrate, and the attachment between the fiber and the component substrate.

FIG. 2 depicts a cross-section similar to that of FIG. 1, of a second embodiment of the integrated optical component according to the present invention.

FIG. 3 depicts a cross-section similar to those of FIGS. 1 and 2, of a third embodiment of the integrated optical component according to the present invention.

FIG. 4 depicts a cross-section similar to those of FIGS. 1-3, of a fourth embodiment of the integrated optical component according to the present invention.

DETAILED DESCRIPTION

We refer now to FIG. 1 showing the integrated optical component according to the invention comprising a substrate 1, for example, formed of glass, and an optical fiber 2 which is protected by a coated portion 3. The fiber 2 is partially stripped and rests upon a step 4 which is formed upon the substrate in such a way that its endface may be coupled with the output of a waveguide 5 formed in the substrate by an ion exchange technique, for example. In accordance with the design and process set forth in the previously cited Dannoux et al. U.S. Pat. No. 4,943,130, which is hereby incorporated by reference for all purposes, a transverse exit groove 6 (of 1 to 2 mm width, for example) can be provided for between step 4 and the junction of fiber 2 with the output of waveguide 5. This mechanical and optical junction is assured by a first drop 7 of an adhesive product having a suitable optical quality. This first drop preferably has a small volume. A second drop 8 of the adhesive product, having a greater volume, is placed upon the fiber and the substrate, to attach the fiber to the substrate. As shown in FIG. 1, drop 8 covers both a stripped portion and a coated portion of said optical fiber. The second drop is separated from the first by transverse exit groove 6. These features of the manufacturing process for the component in accordance with the invention are described in detail in the previously cited Dannoux et al. U.S. Pat. No. 4,943,130.

As is now apparent, the attachment between the fiber and the substrate is necessary at two points separated from one another. As explained above, differential thermal expansions are susceptible to causing mechanical stresses which can deteriorate the attachment.

When these stresses reach certain thresholds, one observes either a break in the optical continuity of the fiber/waveguide attachment at drop 7, a break of the fiber, or a modification of its optical properties. All of these phenomena can seriously affect both the mechanical strength of the fiber/substrate attachment, and the transmission of an optical signal between fiber 2 and waveguide 5, through the partial or total attenuation of this signal.

According to the present invention these problems are avoided by utilizing, in order to create drop 7, an adhesive product which has in its dry state a glass transition temperature $T_g$ within the predetermined operating temperature range for the component (for example $-40°$ to $85°$ C. as indicated above). When, within this temperature range, the temperature of the drop in question rises above the $T_g$ of the drop, the adhesive product of which the drop is comprised passes into a visco-elastic phase. The flexible attachment thus established between the fiber and the substrate by the adhesive product in this phase, allows a slight creeping of the fiber within the drop under the effect of the differential thermal expansions which have been observed. This creeping prevents the stresses which are exerted upon the fiber from reaching the thresholds which are capable of affecting its integrity or the optical continuity of the fiber/waveguide attachment.

In the choice of the adhesive product which constitutes drop 7, one must also take into account the optical qualities of the product, in such a way as not to alter perceptibly an optical signal in its passage between the fiber endface and the integrated waveguide output. In all cases, the temperature $T_g$ of the product within the temperature range under consideration must be chosen so that differential expansion occurring below this temperature $T_g$ does not perceptibly affect the structure or the function of the integrated optical component in accordance with the invention.

At the same time, one utilizes in the making of drop 8 an adhesive product whose glass transition temperature is located within a second temperature range situated generally above the predetermined domain, the lower limit of the second range being $+/-10°$ C. of the upper limit of the predetermined operating temperature range ("generally above" said temperature range).

Thus, the stability of the mechanical attachment between the fiber and the support, over the entire temperature range under consideration, rests upon the adhesive of drop 8, in particular at the upper limit of this range.

The adhesive product chosen for drop 7 has a glass transition temperature $T_g$ located within the operating temperature range, to insure the absorption of differential expansions which would be dangerous for the component, and the optical continuity of the fiber/waveguide attachment. It is understood that it is necessary to choose for drop 7 a transparent adhesive product which has an index of refraction close to that of glass, that is to say close to 1.5.

An integrated optical component thus constructed in accordance with the invention permits the satisfaction of conditions set forth by the above-mentioned preliminary standard, notably in the matter of the strength of the fiber/substrate attachment, under a tensile force carried at $+85°$ C. We have observed, however, certain difficulties in satisfying the conditions set forth by this preliminary standard with respect to operation in a humid atmosphere. We have represented in FIG. 2 another method of manufacturing the integrated optical component in accordance with the invention, modified in order to overcome this problem. In this figure, as in FIGS. 3 and 4, the numerical references which are the same as those used in FIG. 1 correspond to identical or similar elements. The method of manufacture of FIG. 2 is distinguished from that of FIG. 1 in that it comprises a thin drop 8 of adhesive product placed upon fiber 2 at the edge of step 4, this drop being made of an adhesive product having a glass transition temperature located above the temperature range under consideration. This drop 8 is itself covered and overlapped by an overlapping drop 9 of an adhesive product for which the temperature of glass transition is within said temperature range. Drop 8 assures the mechanical integrity of the attachment between the fiber and the substrate throughout the temperature range. Drop 9 protects drop 8 and fiber 2 against mechanical aggressions and against the potential humidity of the ambient atmosphere. As shown in FIG. 2, overlapping drop 9 reinforces the attachment established by drop 8 between the substrate and the fiber, and covers drop 8 and adjacent regions of the stripped and coated portions of optical fiber 2. In the embodiment of the present invention depicted in FIG. 2, drop 8 covers only a stripped portion of the optical fiber and not the coated portion of the optical fiber, whereas drop 9 overlaps a region of the coated portion. In accordance with this manufacturing method, the functions of mechanical attachment and optical continuity are separated. The mechanical attachment is assured by drop 8 and, secondarily, by drop 9, whereas the optical continuity is assured by drop 7.

Generally, as the differential thermal expansions are principally absorbed by drop 7, it is advantageous to arrange, during mounting, a space of approximately 15 to 25 μm, preferably 18 to 20 μm, between the fiber endface and the waveguide output in the substrate, thereby allowing a clearance between the fiber and the waveguide.

An optical component made in conformity with FIG. 2 has enabled the satisfaction of all the conditions set forth by the above-referenced preliminary standard. We have observed, however, that in an atmosphere of high humidity, the swelling of drop 9 under the effect of this humidity may provoke the bowing of the optical fiber 2 above transverse exit groove 6. This bowing has the effect of misaligning the fiber with respect to the waveguide, with a corresponding attenuation of the transmitted optical signal.

In accordance with the invention, we reduce or prevent such a bowing with an integrated optical component made as represented in FIG. 3. Drop 8 of the component represented in FIG. 2 is divided, in the component of FIG. 3, into two drops 8' and 8", set apart from one another, drop 8' attaching the stripped portion of the fiber to step 4 of the substrate while drop 8" is placed at the unstripped coated portion 3 of fiber 2. The adhesive product used for both drops has a glass transition temperature $T_g$ situated generally above the operating temperature range for the component. The combined volume of the two drops 8' and 8" is substantially less than that of drop 9 in FIG. 2. The bowing of the fiber due to the swelling of drop 9 by molecules of water is thereby reduced to a significant extent. The behavior of the component in a humid environment is thereby improved. The effects of fiber bowing at its end, due to the swelling of the adhesive, no longer generate unacceptable misalignment of the fiber with respect to the waveguide.

As indicated in FIG. 3, a transverse groove 10 separates drops 8' and 8". The intersection of the surfaces at the edge of this transverse groove, by means of surface tension, prevent the outflow of drops 8' and 8" which thus remain well separated by groove 10.

A variant of the embodiment of FIG. 3 is represented in FIG. 4. According to this variant, the space separating drops 8" and 8" (of an adhesive with a glass transition temperature $T_g$ situated generally above the operating temperature range of the component), is occupied by a drop 11 of an adhesive having a glass transition temperature located within this temperature range. This drop 11 improves the mechanical behavior of the fiber/substrate attachment. It is necessary to consider the fact that, in the embodiment of FIG. 3, the two drops 8' and 8" of the adhesive having a glass transition temperature located generally above the operating temperature range of the component, define bonding points which are fixed throughout the operating temperature range. Due to the differential thermal expansions when the temperature increases in the temperature range under consideration, a growing tension is exerted within the fiber between drops 8' and 8", even though this tension would be limited by the presence of coated portion 3 between drop 8,, and fiber 2. The intervening drop 11 of the embodiment of FIG. 4 strengthens the resistance of the fiber to this tension, thereby improving the mechanical behavior of the assembly.

In practice, the assembly of fiber 2 and the substrate in the embodiment of FIG. 3 takes place as follows. The fiber and the substrate are first assembled with the aid of the deposit of drop 11, drops 8' and 8" being placed thereupon, drop 8' presenting as low a height as possible, as is represented in FIG. 4. Fiber 2 and the output of waveguide 5 are connected by a drop of glue 7, as carried out in the preceding embodiments.

Adhesive products which are suitable for the present invention and which have glass transition temperatures characterized as indicated above, by virtue of their position in the operating temperature range or generally above this range, can be chosen by one skilled in the art from numerous adhesive products which are readily available, as a function of the particular application targeted and the optical characteristics which will be eventually required of this product. It is known, in this regard, that below their glass transition temperature the adhesive products are solid, whereas above this temperature they are soft, and this effect increases as the temperature deviates from their glass transition temperature $T_g$. The same is true of their thermal coefficient of expansion, which has a more important value above temperature $T_g$ than below that temperature.

The glass transition temperature is a characteristic of each adhesive which can be measured by differential thermal analysis or by differential calorimetry by scanning a dry product with a temperature slope of 5° to 10° C. per minute, with heat starting at a temperature which is situated below the transition temperature $T_g$. One can refer in this matter to the work of R. C. McKenzie entitled "Differential Thermal Analysis", Volume 2, page 392., edited by the Academic Press, and to the article by L. Monnerie which appeared in the publication "Annales des Composites", pages 157 ff. of the edition devoted to the conference of the Society of Technical Analysis and Characterization of Macromolecular Materials, which was held in Paris in 1986.

Adhesive products made of acrylic or vinyl resin with free radical polymerization are particularly suitable. Therefore one can use advantageously for this effect, monomers or oligomers of the acrylic or vinyl type containing one or more double bonds, which give rise to free radical polymerizations initiated by a photo-initiator which, under the action of light (visible or ultra-violet, for example) will create free radicals.

Optionally, one can utilize such resins with an inorganic filler made of a silica powder, or a hard organic material, for example, in order to diminish the sensitivity of the adhesive products to humidity; except, of course, for the drop insuring the fiber/waveguide attachment, which must have a good transparency.

The choice of a particular resin, as we have seen earlier, is a function of the location of its glass transition temperature, within the operating range and thereabove. In this respect one must take into account the variation of this glass transition temperature as a function of the humidity experienced by the resin, as well as the variation of its coefficient of expansion and its Youngs Modulus in the visco-elastic state, as a function of this humidity. The choices to be made as based on these considerations are within the normal skill of one skilled in the art.

Numerous commercially available resins are suitable for making the adhesive products which are used in the present invention.

Thus, adhesive resins having a glass transition temperature $T_g$ within the range of temperature [−40°, +85° C.] which is specified above only as an example, are commercialized by the Elosor Ltd. Corporation under the trade name Vitralit 612B (with $T_g=55°$ C.), or Vitralit 7104, 7105 and 7106.

Adhesives with a glass transition temperature located above this range of temperature are commercialized by the French Corporation EPOTECHNY under the trade names NOA 81 ($T_g=120°$ C.) or NOA 61 ($T_g=130°$ C.); and by the English Corporation Imperial Chemical Industries under the trade names LCR 000 and LCR 070 ($T_g=106°$ C. or 117° C., according to the hardening process used), LCR 050 ($T_g=106°$), LCR 000V ($T_g=100°$ C.), LCR 000/1.52 ($T_g=100°$ C.).

Of course the present invention is not limited to the manufacturing processes described and represented herein which are given only as examples, similar to the preliminary standard cited earlier. The invention extends to all integrated optical components, multiplexing couplers, amplifiers, etc., connected to one or more optical fibers by adhesives, and especially with respect to those adhesives which are capable of passing into a visco-elastic phase in order to permit the absorption without damage by the component of differential expansions which manifest themselves among the diverse elements of the component. The invention is not limited to components which contain a glass substrate in which one or several waveguides are integrated by ion exchange. The invention extends, on the contrary, to components in which this substrate comprises, for example, silica or silicon having waveguides integrated by vapor phase deposition, and to substrates of lithium niobate or indium phosphide.

We claim:

1. An integrated optical component for use in a predetermined temperature range, comprising at least one waveguide integrated in a substrate and having an output coupled to an end of an optical fiber which is attached by a first drop of adhesive to said substrate at said fiber end, and by a second drop of adhesive to said substrate in an area separated from said fiber end, each of said adhesives which form said drops having a glass transition temperature, wherein the glass transition temperature of said adhesive forming said first drop is within said predetermined temperature range, and the glass transition temperature of said adhesive forming said second drop is within a second temperature range, the lower limit of said second temperature range being situated within +/−10° C. of the upper limit of said predetermined temperature range, wherein said fiber includes a stripped portion and a coated portion, and said second drop of adhesive covers only said stripped portion of said optical fiber and not said coated portion of said optical fiber, and further comprising an overlapping drop of an adhesive having a glass transition temperature located in said predetermined temperature range, said overlapping drop reinforcing the attachment established by said second drop between the substrate and the fiber, said overlapping drop covering said second drop and adjacent regions of said stripped and coated portions of said optical fiber.

2. The integrated optical component of claim 1, further comprising a transverse exit groove formed in said substrate which separates said first drop and said second drop.

3. The integrated optical component of claim 1, wherein said adhesives are acrylic or vinyl resins with free radical polymerization.

4. The integrated optical component of to claim 3, wherein said polymerization is a photocuring polymerization.

5. The integrated optical component of claim 1, wherein one or more of the adhesives used to fix the fiber on the substrate include fillers.

6. The integrated optical component of claim 5, wherein said adhesive is filled with an inorganic material or a hard organic material.

7. An integrated optical component for use in a predetermined temperature range, comprising at least one waveguide integrated in a substrate and having an output coupled to an end of an optical fiber which is attached by a first drop of adhesive to said substrate at said fiber end, and attached to said substrate in an area separated from said fiber end by a second drop of adhesive and a third drop of adhesive, each of said adhesives which form said drops having a glass transition temperature, wherein the glass transition temperature of said adhesive forming said first drop is within said predetermined temperature range, and the glass transition temperature of said adhesive forming said second drop is within a second temperature range, the lower limit of said second temperature range being situated within +/−10° C. of the upper limit of said predetermined temperature range, wherein said third drop of adhesive is placed further away from said fiber end than said second drop, in order to attach said fiber to said substrate, and wherein the glass transition temperature of said adhesive forming said third drop is within said second temperature range.

8. The integrated optical component of claim 7, wherein said fiber includes a stripped portion and a coated portion, and wherein said third drop of adhesive overlaps a region of said coated portion.

9. The integrated optical component of claim 7, further comprising a transverse groove formed in said substrate, said groove separating said second drop and said third drop.

10. The integrated optical component of claim 8, further comprising a transverse groove formed in said substrate, said groove separating said second drop and said third drop.

11. The integrated optical component of claim 7, further comprising a fourth drop of adhesive, said fourth drop attaching to said substrate a portion of said fiber located between said second drop and said third drop, and wherein the glass transition temperature of said adhesive forming said fourth drop is within said predetermined temperature range.

12. The integrated optical component of claim 8, further comprising a fourth drop of adhesive, said fourth drop attaching to said substrate a portion of said fiber located between said second drop and said third drop, and wherein the glass transition temperature of said adhesive forming said fourth drop is within said predetermined temperature range.

13. The integrated optical component of claim 9, further comprising a fourth drop of adhesive, said fourth drop attaching to said substrate a portion of said fiber located between said second drop and said third drop, and wherein the glass transition temperature of said adhesive forming said fourth drop is within said predetermined temperature range.

14. The integrated optical component of claim 10, further comprising a fourth drop of adhesive, said fourth drop attaching to said substrate a portion of said fiber located between said second drop and said third drop, and wherein the glass transition temperature of said adhesive forming said fourth drop is within said predetermined temperature range.

15. The integrated optical component of claim 7, wherein said adhesives are acrylic or vinyl resins with free radical polymerization.

16. The integrated optical component of claim 15, wherein said polymerization is a photocuring polymerization.

17. The integrated optical component of claim 7, wherein one or more of the adhesives used to fix the fiber on the substrate include fillers.

18. The integrated optical component of claim 17, wherein said adhesive is filled with an inorganic material or a hard organic material.

19. An integrated optical component for use in a predetermined temperature range, comprising at least one waveguide integrated in a substrate and having an output coupled to an end of an optical fiber which is attached by a first drop of adhesive to said substrate at said fiber end, and by a second drop of adhesive to said substrate in an area separated from said fiber end, each of said adhesives which form said drops having a glass transition temperature, wherein the glass transition temperature of said adhesive forming said first drop is within said predetermined temperature range, and wherein one or more of the adhesives used to fix said fiber on said substrate include fillers.

20. The integrated optical component of claim 19, wherein said adhesive is filled with an inorganic material or a hard organic material.

21. The integrated optical component of claim 19, wherein the glass transition temperature of said adhesive forming said second drop is within a second temperature range, the lower limit of said second temperature range being situated within +/−10° C. of the upper limit of said predetermined temperature range.

* * * * *